United States Patent Office 3,532,528
Patented Oct. 6, 1970

3,532,528
COATED METAL FLAKES AND METHOD
OF PREPARING THE SAME
Carleton Richard Bradshaw, Central Islip, Hal-Curtis
Felsher, Jericho, and Walter J. Hanau, Hicksville, N.Y.,
assignors to Claremont Polychemical Corporation, Roslyn Heights, N.Y., a corporation of New York
No Drawing. Continuation-in-part of application Ser. No. 760,078, Sept. 16, 1968, which is a continuation-in-part of application Ser. No. 593,752, Nov. 14, 1966, which in turn is a continuation-in-part of application Ser. No. 415,197, Dec. 1, 1964, which also in turn is a continuation-in-part of application Ser. No. 193,866, May 10, 1962. This application July 16, 1969, Ser. No. 842,400
Int. Cl. C09c 3/100; C23d 5/00
U.S. Cl. 106—290
28 Claims

ABSTRACT OF THE DISCLOSURE

Metal flakes, especially copper-based metal flakes of about 20 to 400 mesh or less, are rendered tarnish-resistant by a uniform coating of sodium silicate and/or a polyvalent metal silicate, such as calcium silicate. A sodium silicate coating is provided by boiling a mixture of flake, water and sodium silicate solution to degrease the flake, adding an organic carrier and a surfactant to form an emulsion of sodium silicate solution in the carrier having the flake suspended in the emulsion, evaporating off the water to form a paste, adding an organic solvent to form a suspension of paste in the solvent, adding dilute aqueous solution, such as sodium hydroxide or sodium carbonate to precipitate the coated metal flakes, decanting the liquid and drying the coated flakes. The flakes are desirably treated with an aqueous solution of a polyvalent metal salt, such as calcium acetate prior to drying. Alternatively, the initial degreasing step can be conducted with aqueous ammonia as an additional component, which permits a reduction of the amount of sodium silicate. Thereafter, an organic solvent such as toluene and a non-ionic emulsifier are added, the aqueous phase is removed, water and sodium silicate solution are added to form a slurry, the organic solvent is distilled off, a surfactant such as alkylated glycene and aqueous calcium chloride are added to the aqueous suspension, the suspension is boiled, and water is removed to yield dry coated flake. The dried flakes may be further treated with additional stabilizing materials, such as vinyl stabilizers or chelating agents.

DESCRIPTION OF THE INVENTION

This invention relates to novel compositions and to novel processes for producing said compositions. More particularly, this invention relates to novel coated metal flakes and to methods of producing said flakes.

This application is a continuation-in-part of our copending application Ser. No. 760,078 filed Sept. 16, 1968 now abandoned, which in turn is a continuation-in-part of our copending application Ser. No. 593,752, filed Nov. 14, 1966, now abandoned, which in turn is a continuation-in-part of our copending application Ser. No. 415,197, filed Dec. 1, 1964, now abandoned, which in turn is a continuation-in-part of application Ser. No. 193,866, filed May 10, 1962, now abandoned.

Metal flakes are being incorporated in ever-increasing amounts as pigments in plastic materials and the like for decorative effects. In addition there are many other uses for metal flakes such as bronze, brass or "gold" pigments which contain copper with or without zinc and/or small amounts of aluminum or other metals, in fields such as latex paints, vinyl lacquers, nitrocellulose lacquers and castable plastics such as epoxy polyesters and vinyl plastisols which may be molded at low pressures. Unfortunately, however, metal flakes tarnish from exposure to the atmosphere or else react with other materials present in the plastic, latex, or lacquer, etc. These degradative effects have materially adversely affected the suitability of incorporating metal flakes of the type described above in these compositions.

It is therefore an object of the present invention to provide novel coated metal flakes which will be tarnish resistant.

Another object is to provide methods by which metal flakes of the type described may be coated with moisture impermeable materials.

A still further object of this invention is to provide castable plastics having dispersed therethrough the novel compositions of this invention.

Therefore, according to the present invention, there are provided novel compositions comprising metal flakes coated with a glass-like material. The envelopment of metal flakes such as brass, copper, alloys theerof etc. in a glass-like envelope, as will be discussed in greater detail hereinafter, provides what we consider to be the ultimate in protection of metal flakes against tarnishing or degradation. This is because glass is generally unreactive and inert to acids, atmosphere and many other corrosive or degradative materials. Consequently, surrounding the metal flakes with a glass-like coating imparts this stability to the flakes themselves.

Thus we provide metal flakes having a coating of a metal silicate, preferably sodium or calcium silicate. The coated metal flakes of this invention may be in the form of a paste containing the metal flakes dispersed therethrough or they may be in the form of free flowing dry metal flakes.

The coated metal flakes of this invention may be produced by what we call an emulsion technique or by what we call a precipitation technique. In either technique, however, the coating is formed by physical deposition of the coating on the metal surface rather than by reaction with the metal. As a result, coatings of about 1000 angstrom units or more in thickness are readily achieved, with coatings having thicknesses in the range of about 2000 to about 6000 angstrom units being preferred.

In forming the compositions of the present invention by the emulsion technique, a mixture of metal flakes, water and sodium silicate solution is formed and brought to a boil with agitation. Metal flakes as purchased from manufacturers are generally coated with stearic acid or metal stearates as a processing aid and preventative against tarnishing. Since silicates are not very reactive with brass, copper or other metal surfaces at best, it is important that the greasy coating on the flakes be removed in order to facilitate the latter coating of the flakes with the silicate. Boiling with an alkaline silicate solution accomplishes this. To this hot mixture a non-volatile water immiscible organic carrier, and a small amount of a surfactant is added thereby forming an emulsion of aqueous sodium silicate solution in organic carrier.

For example, a composition comprising a mixture of 100 parts by weight of metal flakes with approximately 80 to 200 parts by weight of water and about 16 to 60 parts by weight of a sodium silicate solution containing about 38% total solids and having the sodium oxide and silica in a ratio of 1:3.22 is brought to a boil in a Baker-Perkins or other kneading type mixer in order to remove the stearic acid on the flakes by saponification. The amount of water actually employed will depend to a great extent upon the mesh size and bulk density of the flake; the larger the mesh size of the flake, the greater the amount of water needed. For each particular type of flake, the volume of water must be sufficiently large to keep the flakes moving freely past each other during processing. After boiling the mixture for a period of time such as about 2 to 30 minutes in order to cleanse the flakes, about 0.5% of a surfactant and an oragnic carrier in an amount of about 90 to about 400 parts by weight of the organic carrier for each 100 parts by weight of the metal flakes are added to the mixture. Generally the amount of carrier used is dependent upon the mesh size of the flakes; the larger the flake, the greater the amount of carrier needed to keep the flakes moving past each other during processing. While more than the required amount of carrier may be used if desired, additional amounts do not confer any additional advantages.

Upon addition of the surfactant to the mixture, an emulsion of the dilute sodium silicate solution in the organic carrier is formed, with the metallic flakes suspended in the emulsion. Continued application of heat gradually eliminates water so that as the sodium silicate emulsion becomes concentrated and sticky, the droplets of sodium silicate solution begin to adhere to the metal flakes and form a coating thereon. The behavior of droplets in this reaction can be pictured somewhat in the manner of a coalescing latex paint. Further heating eliminates the remaining water and produces a paste comprising a hard glass-like envelope of sodium silicate around each flake dispersed throughout the organic carrier. The process is generally completed within about 1 to 5 hours after the addition of the surfactant, the actual heating time being dependent upon the particular equipment employed and temperature used. These factors are readily apparent to those skilled in the art.

While not wishing to be bound by any theory, it is believed that polarity on the part of the carrier vehicle lowers the interfacial tension between said vehicle and the droplets of sodium silicate solution suspended therethrough. This, aided by suitable surfactants, causes the average particle size of the suspended silicate solution droplets to be extremely small. A viscous medium still further stabilizes the emulsion and aids in maintaining the metallic flakes uniformly suspended and out of contact with each other. The result is a smooth, uniform deposition of the suspended sodium silicate solution droplets onto each flake thus depositing enough sodium silicate solids on the flakes to provides the desired protection without causing the undesirable adhesion of flakes to each other.

Likewise, it is believed that the use of a viscous hydrocarbon oil, or, conversely of a thin, polar material, as the carrier vehicle results (as seen under the microscope) in the formation of larger droplets of sodium silicate solution; which may encapsulate two or more flakes, cementing them together on drying; or which may promote enough agglomeration to render the product useless for decorative purposes.

The metal flakes, whether in a dry state or in a paste are coated with a sodium silicate composition, preferably a sodium silicate of high silica content to produce maximum water resistance in the finished product. The sodium oxide to silica ratio may vary over a wide range and many such compounds are known in the industry. Generally we prefer to maintain the sodium oxide to silica ratio in the range of 1:1 to 1:3.75. One such silicate particularly suitable for the purposes of the present invention is a sodium silicate having a sodium oxide to silica ratio ($Na_2O:SiO_2$) of 1:3.22. The sodium silicates employed in this invention are readily available commercial materials sold under a variety of trade names such as Sodium Silicate JM (E. I. du Pont) and Sodium Silicate O (Philadelphia Quartz Co.).

As will be apparent to those of ordinary skill in the art, the metal must be inert under the reaction conditions. Thus metals which are highly reactive toward water, e.g. the alkali metals, cannot be coated by this method. In addition, this process is of limited utility in coating aluminum because of the ease with which aluminum hydroxide is formed on the surface due to reaction with water.

On the other hand, flakes of metals such as copper and copper alloys, such as brass or an alloy comprising approximately 90% copper and 10% zinc and known in the decorative flake field as palegold bronze are readily coated. The metal flakes have particle sizes generally ranging from about 20 to less than 400 mesh size, although the actual mesh size employed will vary over wide ranges depending upon the projected application and desired aesthetic effect. These flakes generally comprise about 25 to 40% by weight of the total emulsion prior to the evaporation of the water.

In selecting an organic carrier, we prefer liquids of sufficiently high molecular weight so that the viscosity of the liquid does not fall below approximately 100 centipoise at a processing temperature of approximately 212° F.; we prefer liquids of reasonably high polarity, as indicated by complete miscibility of the high molecular weight liquid with anhydrous ethyl alcohol, or alternatively, by the presence in the structural formula, of groups known for their high polarity, such as hydroxyl groups. Among the organic carriers which may be employed in this invention are vinyl plasticizers such as a polyester of glycol and adipic acid of molecular weight of approximately 2,000 such as sold by Rohm & Haas under the trade name Paraplex G-50 and by Monsanto under the trade name Santicizer 409. Of the carriers such as epoxidized soya oil sold by the Archer-Daniel-Midland Co., under the trade name Admex 710, a high boiling aralkyl hydrocarbon sold by Continental Oil Co. under the trade name Conoco H-300 and refined castor oil sold by the Baker Castor Oil Co. under the trade name AA Castor Oil may also be used. We however have obtained the best results using polyesters as the organic carrier and consequently prefer to use this class of material. Generally the carrier comprises 30% to 60% by weight of the total emulsion prior to evaporation of the water.

A surfactant is employed in the processes of this invention in a quantity such that an emulsion of all ingredients is formed; for example, about 0.05 to about 4.0 parts by weight per hundred parts of metal. Surfactants such as sodium salt of an alkyl amino acid, sold by the General Mills Co. under the trade name Derifat 151, or alkylated polyalkoxyphenol surfactants such as an octylphenoxyethanol having an average of 7-8 polyoxyethylene groups in the chain in the para position with respect to the octyl group and sold by Rohm & Haas under the trade name Triton X-114; or an octylphenoxyethanol having an average of 9-10 polyoxyethylene groups in the chain in the para position with respect to the octyl group and sold by Rohm & Haas under the trade name Triton X-100, or a sodium dioctyl sulfosuccinate sold by American Cyanamid under the trade name Aerosol OT have been found to be satisfactory.

The compositions formed by the above described process produce a paste which may be illustrated by the formulations below. It is obvious that there are numerous formulations within the purview of this invention which will be apparent to those skilled in the art from what has been said above.

FORMULATION

| | Parts |
|---|---|
| Palegold flake (90% copper, 10% zinc) about 325 maximum mesh size | 50 |
| Water | 40 |
| Sodium silicate ($Na_2O:SiO_2$—1:3.22 38% solids | 8 |
| Organic carrier | 42.5 |
| Surfactant | 1 |

The paste may be used directly as a decorative pigment in organosols or plastisols as well as other plastic materials compatible with the carrier. This technology is well understood by those skilled in the art to produce galoshes, toys, coated fabrics, etc.

If it is desired to produce a free flowing dry flake encapsulated with silicate, the process above described is modified as follows. After forming the paste described above, a diluent is added in the amount of about 20 to 150 parts by weight per 100 parts by weight of the organic carrier but preferably in the same weight ratio as the organic carrier. We prefer to use toluene as the diluent but other organic solvents such as xylene, benzene and chlorinated hydrocarbons may be employed. To this suspension, a dilute aqueous sodium hydroxide solution is added. The addition of sodium hydroxide solution results in forming an emulsion of low viscosity and causes a rapid settling of the flakes to the bottom of the reaction chamber. The emulsion is removed by several additions and decantations of water and the recovered fraction is dried by suitable means so as to obtain a free flowing flake enclosed in a glass-like envelope. This may be dried by suitable, conventional processes.

In carrying out this modification of the above described process, the amount of aqueous sodium hydroxide added may vary over wide ranges depending upon the amount of carrier-diluent mixtures retained by the flake after decantation. Generally we prefer to use about four times as much sodium hydroxide solution by weight as metal flakes. The aqueous sodium hydroxide solution may have a concentration varying from about 0.5 to 1.5 but we prefer to use a solution of about 1% concentration.

The sodium hydroxide-carrier-toluene emulsion may be broken, i.e., caused to separate in two layers, by the addition of a small amount, generally from about 1 to 5 percent and preferably about 3 percent by weight of the emulsion, of an acid such as phosphoric acid, sulfuric acid, etc. The emulsion separates into an organic layer and an aqueous layer which may be separated by decantation. The carrier-toluene fraction may then be separated by suitable means such as by distillation with the toluene distilling over and leaving the carrier behind. The toluene is condensed and reused in subsequent operations. The carrier may also be reused. Alternatively, rather than separating the toluene-carrier mixture, the mixture may be added in its entirety to another batch at the stage where the carrier would normally be added, then evaporating and recovering the toluene during the normal heating operation.

In a further modification of this invention, the paste to which has been added the diluent may be treated with an aqueous sodium carbonate solution of concentration varying from about 0.5 to 1.5% preferably about 1% instead of the previously referred to sodium hydroxide solution The amount of aqueous solution must be sufficient to wet the flakes thoroughly. The sodium carbonate solution tends to flush the flake into the aqueous phase without forming an emulsion This feature is further aided by use of a surfactant of the predominatly lipophilic or oleophilic type such as alkylated phenol polyester condensates sold under the trade name Triton X-45. The flake is then removed from the aqueous phase and dried. Other mildly alkaline solutions will work similarly, for example, a solution containing from about 0.5 to about 5 parts of sodium citrate per 100 parts of metal, and if desired, sodium acetate may be added in an amount not exceeding the amount of sodium citrate.

A further modification of the above described process involves treating the water slurry of metal flakes after washing out all sodium carbonate solution and/or other water solubles, with a water solution of a polyvalent metal acetate. We have found that boiling the sodium silcate coated product for from about one-half to one hour in a dilute aqueous solution of a polyvalent metal acetate still further increases the resistance of the final product to attack by water, sulfides, heat, etc. We believe that this improvement occurs due to the replacement of the sodium in the sodium silicate coating encapsulating each flake, with a polyvalent metal which is denser and less water soluble than the sodium ion. We have found that the polyvalent metal acetate may be added at about two parts by weight per 100 parts by weight of metal. A larger amount, though not harmful, has no added advantage, and a smaller amount tends toward an incomplete reaction. A total amount of water present during the reaction equalling four times the weight of the metal present has been found not to be harmful, however, only enough water need be present to form an easily mixable slurry during the reaction. This is usually from about 1 to 2 times the weight of the metal. The polyvalent metal whose acetates have been found effective for this modification are those metals in Group II of the Periodic Table such as calcium, zinc and barium. We have found the calcium acetate to be the most satisfactory for our purposes. Acetates are chosen as the non-metallic ion due to their solubility and because their acidity in aqueous solution is insufficient even at high concentrations to attack the coated metal flakes. Other ions such as chlorides may be used but in this case, care would have to be taken during the reaction to prevent the slurry from becoming too acidic. Following the reaction with the polyvalent metal acetate the flakes may again be washed free of water solubles by any conventonal method and then freed of water by conventional methods. In this connection, however, we prefer to add an organic water immiscible liquid such as an aliphatic hydrocarbon to the water slurry thus enabling the flake to flush back into the organic phase which can be evaporated with less heat than that required to evaporate water.

Alternatively, the paste may be converted into a dry pigment simply by extraction of the organic carrier by means of a volatile solvent miscible with the organic carrier, and evaporating the remaining volatile solvent. Separation of the coated metal from the mixture of organic carrier and volatile solvent may be made by filtration, centrifuging, settling and decantation, or by other suitable and known methods.

In forming the compositions of the present invention by the precipitation technique the first step in this process is essentially the same as that in the emulsion technique discussed above, namely the priming and cleaning of the metal flakes by the removal of the stearic acid coating present on the flakes. This is accomplished by placing a mixture of water, sodium silicate, metal flakes, surfactants and concentrated aqueous ammonia in a steam jacketed kettle equipped with a paddle type stirrer and mixing the materials at or near their boiling point for about ½ hour. The sodium silicate, metal flakes and surfactants are preferably the same type materials as discussed previously in connection with the emulsion technique. The ammonia which is used in this process is preferably a concentrated 28% aqueous solution of ammonia. In this step, we prefer to first mix the water and silicate together and bring the mixture to a boil before adding the metal flakes, surfactant and aqueous ammonia solution. In this step a much smaller amount of sodium silicate is utilized than in the emulsion technique discussed previously. The small amount of silicate used in this process is just sufficient to form a protective copper and zinc silicate coating on the flake to prevent the ammonia promoting destructive oxidation of the flake. The ammonia reacts with the stearic acid on the flakes to form soluble ammonium stearate. Any copper oxide present is converted to the soluble cuprammonium ion. The mixture is then cooled and an organic solvent such as toluene and a non-ionic emulsifier such as alkylated polyalkoxyphenol is added. The addition of the toluene coats the flakes causing them to stick together so that they will settle rapidly. Any excess toluene which does not perform that function aids the emulsifying agent in keeping the oxide and stearate compounds and other debris present from the initial priming step in suspension so that when the water layer is decanted, these contaminants are removed. The metal flakes are then washed preferably three or more times, the metal flakes being permitted to settle to the bottom of the reaction vessel and the water portion decanted each time. At this point, the flakes have ben washed and primed and all stearates and other contaminants removed.

Enough water and sodium silicate solution are then added to the toluene phase to form a slurry. The initial sodium silicate solution was used to prevent oxidation of the metal. This sodium silicate solution is employed to form a glass envelope around the flake. The mixture is now heated until all of the toluene has been distilled off in order to prevent a film of toluene on the flake from subsequently interfering in the process. Water is added as necessary to maintain an easily mixable batch. When all of the toluene has been removed, an aqueous suspension of flakes coated with a very thin film of metal silicates in a dilute aqueous solution of sodium silicate is obtained.

A surfactant such as an akylated glycine is then added to the mixture together with a solution of calcium chloride such as a 50% aqueous solution of calcium chloride. When the calcium chloride is added, the mixture at first thickens and it is necessary to add additional water to dilute it. The thickening of this mixture on addition of the calcium chloride may be due to the formation around each flake of a uniform coating of a calcium silicate gel which is considerably water swollen due to the presence of sodium ions. The mixture is then boiled for about ½ hour during which time the remaining sodium ions are replaced with calcium ions and this replacement, together with the heat, dehydrates the gel to form a uniform calcium silicate glass envelope around each flake. This envelope, being dehydrated, is considerably thinner than the initial gel. Without wishing to be bound to any theory, we believe that the addition of calcium chloride causes a double decomposition reaction to occur and causes the calcium silicate to deposit on the flake which apparently serves as a nucleus for the precipitated calcium silicate. Coprecipitated with the calcium silicate is the alkyl glycine which is also deposited on the surface of the flake. We believe that this helps to prevent the flakes from agglomerating. The mixture of calcium chloride and sodium chloride solutions are then washed out of this reaction mass by any convenient means such as settling and decantation, filtration, etc., and by applying heat to remove water. The result is a decorative flake similar to that obtained by the emulsion technique, which flake is coated with a glassy envelope of calcium silicate.

In carrying out the above described process, the amounts of the materials employed obviously may vary over rather wide ranges. For example, when about 300 parts of flakes are employed, the amount of water employed in forming the initial mixture will vary from about 600 to about 1200 parts. The purpose of the water is of course to maintain good viscosity in the solution. The amount of sodium silicate utilized in the process varies from about 5 to 15 parts in the initial coating step to about 20 to 40 parts in the final coating step. We prefer to use as little sodium silicate as possible since larger amounts cause a thicker gel to form. The amount of surfactant employed in this process may vary from about 6 to 24 parts and preferably about 12 parts. The amount of ammonia solution may vary over wide ranges although we prefer to use about 18 to 30 parts of ammonia. Too much ammonia causes oxidation of the flake while too little is ineffective in removing the soluble stearates, etc. The amount of toluene will vary over a wide range, for example, from about 120 to 200 parts may be utilized. Too much toluene causes thickening of the emulsion and prevents the flake from settling. The alkyl glycine may vary over rather wide ranges, for example from about 6 to 18 parts and preferably about 12 parts. The more alkyl glycine employed, the more washings necessary to remove it. The calcium chloride may vary over a wide range, for example, from about 40 to 160 parts and we prefer to use about 80 parts. When the lower amount is used, the efficiency of the precipitation is lessened and the material tends to remain more of a water soluble gel and presents problems in redissolving the gel. As more calcium chloride is used, more solubles are formed which have to be washed out of the mixture. All of the above parts are by weights.

Other organic solvents such as xylene, benzene and aliphatic hydrocarbons may be employed although we prefer to utilize toluene. Benzene is a toxic material whereas xylene is difficult to boil off. Any soluble calcium salt such as calcium acetate may be used in place of the calcium chloride. Likewise, any bivalent or polyvalent metal such as aluminum, lead, magnesium or barium, other than an alkali metal, may be used. We believe the calcium functions better because it is a small ion and keeps the gel structure tight. The other metals have a larger structure and permit some oxidation to take place. However, the other metals may be used just so long as they form soluble salts at pH's of four or higher and also form stable silicates. In addition to the alkylated glycines, any zwitter ion surfactants may be employed.

The flakes of the present invention will withstand prolonged periods of heating. For example, uncoated flakes will oxidize and discolor when heated at about 350° F. for about 10 or 15 minutes. The flakes of this invention will not tarnish appreciably in an hour or more at a dull red heat. When heated to bright orange heat, the resultant dull brown flake observed under the microscope is seen to consist of globules of melted, still untarnished metal with a glassy, faintly discolored transparent coating of silicate, which coating has retained the shape of the original flake in every detail. Thus, flakes prepared in accordance with the emulsion technique will sustain heating at 700° F. for more than one hour, while those prepared in accordance with the precipitation technique will sustain heating at 800–850° F. for one hour or more. Because of these unique properties, these flakes are particularly adaptable for use in high temperature coatings, or may even be used with some low temperature ceramics and porcelain enamels. If desired, fillers, i.e., non-opaque pigments insoluble in the sodium silicate to some extent may be incorporated into the sodium silicate but we have found that this gives only slight improvements in oxidative resistance.

It has been found that upon exposure to air for a week or more, the sodium oxide in the coated flake reacts with the carbon dioxide in the air to form a carbonate. We have found that if these aged flakes are then leached with hot water and dried, there is some further improvement in oxidative resistance.

The dry free flowing flakes have been found to be particularly suitable for use in latex paints, lacquers, varnishes, baking enamels and in the integral pigmenting of thermoplastic resins processed by conventional methods such as injection molding, compression molding, extrusion and calendering.

The following examples are illustrative of the processes of this invention. It is apparent that many modifications of these processes will be obvious to those skilled in the art. In the following examples, all quantities are on a weight basis and all formulations are based upon 100 parts of a metal flake.

Example I

To 100 parts of water is added 18 parts of a sodium silicate solution having a sodium oxide to silica ratio of 1:3.22 containing 38% total solids and the mixture is heated to boiling. One hundred parts of a ball milled brass flake consisting of an alloy of approximately 70 parts copper and 30 parts zinc having a water coverage of about 4,000 square centimeters per gram and having a fineness such that about 98% will pass through a 200 mesh wire sieve and 90–95% will pass through a 325 mesh wire sieve is added to the mixture. Two parts of a surfactant of the amino-acid type sold by General Mills under the trade name Derifat 151, and 0.4 part of a defoamer of the silicone type sold by Dow Corning under the trade name Antiform A are heated and mixed with the other ingredients for five minutes. To this mixture is then added 120 parts of a polyester organic carried of the glycol-adipic type having a molecular weight of about 2,000 and sold by Rohm & Haas under the trade name Paraplex G–50. The resultant mixture is then heated in a steam jacketed mixer at 250° F. jacket temperature under 3 to 9 inches vacum for about 8 hours until all the water is evaporated. The residue recovered is a paste consisting of sodium silicate coated metal flakes dispersed throughout the polyester.

Example II

The process of Example I is repeated but in place of a ball milled flake, a stamped flake of the same alloy composition is employed except that the flake has approximately 2,000 square centimeters per gram water coverage and the amount of polyester organic carrier employed is 136 parts. A paste of sodium silicate coated flake dispersed throughout the organic carrier is recovered as the residue.

Example III

To 100 parts of water is added 27 parts of a sodium silicate solution having a sodium oxide to silica ratio of 1:3.22 and containing 38% solids and the mixture is heated to boiling. To the hot mixture is added 100 parts of a stamped flake alloy comprising 89 parts copper and 11 parts zinc and having a fineness such that 99% will pass through a 325 mesh wire sieve and having a water coverage of about 4,200 square centimeters per gram. To this hot mixture is then added 4 parts of a surfactant of the amino-acid type sold by General Mills under the trade name Derifat 151, and 0.4 part of a defoamer of the silicone type sold by Dow Corning under the trade name Antifoam A. The mixture is then agitated for 5 minutes and then 100 parts of a polyester of the glycol-adipic type having a molecular weight of about 2,000 and sold by Rohm & Haas under the trade name Paraplex G–50 is added as an organic carrier. The resultant mixture is then heated in a steam jacketed mixer at 250° F. jacket temperature under 3 to 9 inches vacuum for about 12 hours until all water is eliminated. A paste of sodium silicate coated flakes in organic carrier is recovered.

Example IV

To 81 parts of water is added 16 parts of a sodium silicate solution having a sodium oxide to silica ratio of 1:3.22 and a solids content of 38% and the mixture is heated to boiling. To the hot mixture is added 100 parts of stamped metal flakes consisting essentially of copper and having a fineness such that 98% will pass through a 200 mesh wire sieve and 90–95% will pass through a 325 mesh wire sieve. The mixture is heated for 15 minutes and 2 parts of a surfactant of the amino-acid type sold by General Mills under the trade name Derifat 151 and 0.4 part of a defoamer of the silicone type sold by Dow Corning under the trade name Antifoam A and 87 parts of an organic carrier comprising a polyester of the glycol-adipic-type having a molecular weight of about 2,000 and sold by Rohm & Haas under the trade name Paraplex G–50 are added. The mixture is heated in a steam jacketed mixer at 250° F. jacket temperature under 3 to 9 inches vacum for about 8 hours until all water is evaporated. A paste of sodium silicate coated metal flakes dispersed throughout the organic carrier is recovered.

Example V

To the paste of Example II, 100 parts of toluene, 300 parts of water, and 4 parts of sodium citrate are added thereby forming a slurry which is then agitated for about 5 minutes. The agitation is stopped, the suspended material is allowed to settle for about 30 minutes and the supernatent emulsion is decanted. 300 parts of water is then added forming another slurry, the suspended material is allowed to settle and the supernatent emulsion is decanted. This procedure is repeated 3 times. Thereafter, 309 parts of water and 1 part of calcium acetate are added to the settled material and the mixture boiled with agitation for 1 hour. The heating and agitation is stopped and the mixture is allowed to settle for 15 minutes and the supernatant liquid decanted. The resultant product is washed and decanted 4 times with 300 part portions of water. The water is removed by filtration and the product oven dried at 250° F. The product resulting is a free flowing dry powder of metal flakes coated with sodium silicate.

The emulsion removed in the first decantation is separated by the addition of 3% of a glacial phosphoric acid (based on the weight of the emulsion) to remove organic materials for reuse.

Example VI

To the paste of Example II are added 60 parts of toluene, 60 parts of water, 2 parts sodium citrate and 2 parts dodium acetate. The mixture is blended with agitation and then allowed to settle for 15 minutes while maintaining the temperature near the boiling point of the mixture. The organic layer is decanted and 400 parts of water is added to the residue and the supernatent liquid is decanted. This procedure is repeated 3 times. 400 parts of water is then added together with 1 part of calcium acetate and the mixture is boiled with agitation for 1 hour. The mixture is then allowed to settle and the supernatant liquid is decanted while the residue is washed with 400 part portions of water 4 times. The water is removed by filtration and the product oven dried at 250° F. The resultant product is a dry free flowing powder of metal flakes coated with sodium silicate.

Example VII 60 parts of a sodium silicate solution having a sodium oxide to silica ratio of 1:3.22 and 38% solids is added to 200 parts of water and the mixture heated to boiling. To the hot mixture is added 100 parts of metal flakes of an alloy consisting of 89 parts copper and 11 parts zinc and having a mesh size of between 80 to 100 and the resultant mixture agitated for 15 minutes. To the hot mixture is then added 0.8 part of a surfactant of the amino-acid type sold by General Mills under the trade name Derifat 151, 0.5 part of a defoamer of the silicone type sold by Dow Corning under the trade name Antiform A and 300 parts of an organic carrier comprising a polyester of the glycoladipic type having a molecular weight of about 2,000 and sold by Rohm & Haas under the trade name Paraplex G–50. The resultant mixture is heated until all the water is removed and a paste of sodium silicate coated flake in polyester organic carrier remains. To the paste is added 300 parts of toluene, 300 parts of water and 2 parts of sodium hydroxide. The mixture is allowed to settle for 5 to 10 minutes and the supernatant emulsion then decanted. The residue is washed and decanted twice with 400 parts of water and the recovered flake dried at 250° F. The product recovered is a dry free flowing flake coated with sodium silicate.

Example VIII

Example VII is repeated except that in place of the 80 part copper and 11 part zinc alloy, there is used an alloy consisting of 70 parts copper and 30 parts zinc.

Example IX

Example VII is repeated except that 65 parts of a sodium silicate solution is used together with 36 parts of clay sold under the trade name Edgar ASP–200.

Example X

Example VII is repeated except that the metal flake employed has a mesh size of between 20 and 30 and 7 parts sodium hydroxide is added.

Example XI

A mixture of 600 parts water, 100 parts metal flake having a mesh size between 80 and 100 and consisting of 89 parts copper and 11 parts zinc, and 1.2 parts glacial phosphoric acid is heated to boiling. The blend is then mixed for 15 minutes in a double-cone dryer and about 500 parts of liquid is then drained off. To the residue is added 500 parts of water and 100 parts of a sodium silicate solution having a sodium oxide to silica ratio of 1:3.22 and containing 38% solids. The resultant mixture is brought to a boil and maintained at this temperature for 1 hour. 560 parts of supernatant is then drained off and 60 parts of a high boiling aralkyl hydrocarbon sold by Continental Oil Company under the trade name Conoco H–300 is added. The resultant mixture is heated under 6 to 12 inch vacuum until the temperature rises to 200° F. To this mixture is added 600 parts of water, 1.6 parts sodium carbonate and 3 parts of analkylated polyalkoxyphenol surfactant sold by Rohm & Haas under the trade name Triton X–114. The resultant mixture is agitated and heated to near its boiling point. The heat is discontinued and the hydrocarbon layer decanted. The residue is washed twice with 600 parts of water and dried under vacuum at approximately 250° F. The resultant product is a dry free flowing powder consisting of metal flakes coated with sodium silicate.

Example XII

To 97.5 parts of water is added 2.5 parts sodium metasilicate powder having a sodium oxide to silica ratio of 1:1. The metasilicate is dissolved in the water and then 120 parts of stamped metal flakes of an alloy consisting of approximately 70 parts copper and 30 parts zinc is added. The mixture is heated to its boiling point and agitated for about 30 minutes. To the hot mixture is added 80 parts of a high boiling aralkyl hydrocarbon sold by Continental Oil Company under the trade name Conoco H–300. The resultant mixture is placed in a gravity-convection air oven at 350° F. until all water has been removed. The product recovered is a paste containing metal flakes covered with sodium silicate.

Example XIII

The process of Example XII is repeated except that 95 parts of water and 5 parts of a sodium silicate solution having a sodium oxide to silica ratio of 1:1.6 and having a solids content of 50.7% is employed.

Example XIV

The process of Example XII is repeated except that 95 parts water and 5 parts of a sodium silicate solution having a sodium oxide to silica ratio of 1:2.4 and a solids content of 46.9% is employed.

Example XV 600 parts of water is added to a steam jacketed kettle equipped with a paddle type stirrer. 7.5 parts of 38% sodium silicate solution ($SiO_2/Na_2$ of 3.22/1.00) is added and the mixture brought to a boil. 300 parts of metal flakes (300 mesh, 80 part copper 20 part zinc) are then added and the mixture brought to a boil. The steam is then turned off in the jacket and 15 parts of 28% aqueous ammonia and 12 parts of an octylphenoxyethanol having an average of 7–8 polyoxyethylene groups in the chain and sold by Rohm & Haas under the trade name Triton X–114 are added and mixed 30 minutes. 120 parts of toluene are then added causing the flake to flush into the toluene. The flake-toluene mixture is allowed to settle and the aqueous phase poured off.

600 parts of water preheated to 180° F. is then added to the mixture and after mixing the flakes are permitted to settle. The water is poured off and this step repeated three more times. 180 parts of water together with 33 parts of the previously mentioned sodium silicate solution are added and the mixture heated to remove the toluene adding water as needed to keep the mixture fluid. The final steam pressure in the jacket is about 30 lbs. The last traces of the toluene which are tenaciously absorbed on the flake surface are removed for optimum results. 12 parts of an alkylated glycine sold by General Mills under the trade name Derifat 170–C are added together with 180 parts of water and 81 parts of 50% calcium chloride solution. At this point the mass thickens as a mixture of calcium salts of the alkylated glycine and calcium silicate are precipated onto the flake surfaces. The mixture is boiled for at least 30 minutes with additional water being added as necessary to replace that which boils off. During this boiling, the material assumes much brighter appearance as the initial water of hydration in the calcium silicate coating is partially eliminated and the calcium salts of the alkylated glycine migrate to the outermost surface. The combination of the shrinkage of the calcium silicate gel and the formation of a lubricating hydrocarbon on the outer surfaces of the flakes during this digestion process prevents agglomeration of the flakes. The batch is cooled and 300 parts of toluene added again causing the flake to flush into the toluene phase which settles to the bottom of the kettle. The aqueous solution of sodium and calcium chlorides is poured off and the batch washed three times with 2% aqueous solution of ammonia. 600 parts of water is added and the mixture brought to a boil to remove the toluene with additional water being added as needed. The mixture is permitted to settle and is decanted. 150 parts of water is added and this slurry is passed over an endless belt vacuum filter equipped with hot water sprays to further wash the material and to produce a product containing about 30% by weight of water. The cake is then fed onto an endless belt that passed under infra-red heaters to eliminate all water. To the dry powder is then added ½% by weight of stearic acid and the powder placed in a rotating brush polisher for four hours and then screened through a 200 mesh screen. The final product withstands one hour at 800° F. with little color change. It is exceptionally resistant to sulfide staining and to outdoor weathering. It gives a brilliant red-gold color to any paint or lacquer or molded or sheeted plastic into which it is incorporated.

Example XVI

The process of Example XV is repeated except that the metal flake comprises an 80% copper, 20% zinc flake of 2200 square centimeters per gram of water coverage.

Example XVII

The process of Example XV is repeated except that the metal flake comprises a 90% copper, 10% zinc flake having 3000–4000 square centimeters per gram of water coverage.

Example XVIII

The process of Example XV is repeated except that the metal flake comprises an 80% copper, 20% zinc flake having 3000–4000 square centimeters per gram of water coverage.

Example XIX

The process of Example XV is repeated except that benzene is used in place of toluene.

Example XX

The process of Example XV is repeated except that a mixed hydrocarbon fraction of C-8 to C-9 hydrocarbons are employed in place of toluene.

Example XXI

The process of Example XV is repeated except that a sodium dioctyl sulfosuccinate is used as the surfactant in place of the octylphenoxyethanol.

Example XXII 600 parts of water are placed in a steam jacketed kettle and 7.50 parts of the 38% sodium silicate solution used in Example XV is added and the mixture brought to a boil. 300 parts of an 80% copper, 20% zinc metal flake having 2200 square centimeters per gram of water coverage is added and the mixture again brought to a boil. 15 parts of 28% aqueous ammonia is added and the mixture agitated for 30 minutes following which it is filtered and water washed on an endless belt type vacuum filter. The press cake is returned to the kettle and 180 parts of water are added together with 33 parts sodium silicate solution used in Example XV, the material is brought to a boil and 12 parts of an alkyl glycine and 81 parts of a 50% aqueous calcium chloride solution are added. The mixture is boiled for 30 minutes, washed and filtered over an endless belt vacuum filter. The material is reslurried with water and again passed over the filter until the wash water gives a negative test for calcium ions. The material is dried and polished as in Example XV. This product has heat stability and tarnish resistance equivalent to that of the product of Example XV.

Example XXIII 100 parts of an 80% copper, 20% zinc flake of a size entirely retained by 100 mesh screen but which completely passes through an 80 mesh screen is added to a vessel equipped with a propeller blade mixer. 370 parts of water and 1.25 parts of 80% phosphoric acid is added. The mixture is agitated for 30 minutes and one part of an octylphenoxyethanol having an average of 7-8 polyoxyethylene groups in the chain and sold by Rohm & Haas under the trade name Triton X-114, 15 parts of Paraplex G-50 (a polyester plasticizer) and 50 parts of mineral spirits are added and the mixture agitated for 15 minutes. The flakes are then allowed to settle and the water poured off. The flakes are then washed twice more with 375 parts of water. At this point, the flake surfaces have been lightly phosphated and cleaned of stearates and oxides. 30 parts of the same silicate solution as that used in Example XV together with 3 parts of the octylphenoxyethanol surfactant and 150 parts of mineral spirits are added. The mixture is agitated for 15 minutes and then placed in a steam jacketed double cone rotary vacuum drier and heated until all the volatiles are dried off. The surfactant in the early stage of the drying partially emulsifies the sodium silicate solution to ensure its even distribution over all of the flake surfaces whereon it dries. The polyester plasticizer has a viscosity under heat and a wetting action of the flake surface such as to prevent the flakes from sticking to each other and to the inner surface of the vacuum drier. The mixture is then allowed to cool slightly and 15 parts of toluene, 375 parts of water, 7.5 parts of sodium acetate and 2.5 parts of sodium citrate are added. The mixture is agitated for 30 minutes. A perforated plate instead of a solid plate is placed on the rotary vacuum drier and the free liquid drained out. The toluene liquefies the polyester plasticizer to a lower viscosity, the sodium acetate and sodium citrate cause the dried sodium silicate coating on the flakes to be water wettable and the surfactant already present on the mixture emulsifies the organic phase so that it is carried off with the water as a milky emulsion. 375 parts of water are then added and the mixer agitated for 10 minutes with a solid plate on top. The solid plate is then replaced with a perforated plate and the mixture again drained. This step is repeated four times in order to completely wash away any organic materials. A water wet flake coated with dried sodium silicate (which once dried is no longer water soluble) remains. 375 parts of water and 1.25 parts of calcium chloride is then added and the mixture boiled for one hour. This step replaces some of the sodium in the sodium silicate coating on the flake with calcium. This increases the heat stability and the tarnish resistance of the material. The perforated plate is placed over the vessel and the flake washed until the effluent water is free of calcium ions. The material is then heated and vacuum dried.

This material will withstand as much as 1300° F. for one hour without severe oxidation.

Despite the high degree of protection offered by the oxidation and water-resistant coating of this invention, there are instances of extremely severe conditions of use under which improved performance is desired. For example, when the flake is a copper alloy employed as a pigment in a vinyl resin system, conditions such as high pigment content, elevated temperature, the presence of fatty acids, or the use of the pigmented vinyl as a thin film, all accelerate degradation of the vinyl resin and attack on the pigment. Although a wide variety of vinyl stabilizers has been developed, the stabilizers are frequently found insufficient to prevent attack of the pigment under such severe conditions.

It has been found in accordance with this invention, however, that additional protection results if the vinyl stabilizer is incorporated into the flake product of this invention. The means by which the stabilizer protects the metal is not known, i.e., it is not known whether the stabilizer penetrates the coating and leaks onto the surface of the metal, is sorbed on the surface of the coating, or becomes incorporated into the coated flake in some other manner. Regardless of the mode of action, however, it has been found desirable to incorporate vinyl stabilizers in the coated flake of this invention.

The particular vinyl stabilizer which is employed is not critical to this invention, and any of those already known to the art may be employed, giving due consideration to the specific end use of the pigmented vinyl composition. Illustrative examples include lead salts or soaps, such as basic lead carbonate, tribasic lead sulfate, lead silicate, lead stearate and dibasic lead phthalate, lithium soaps, e.g. lithium stearate, silicon soaps, zinc soaps, barium soaps, cadmium soaps, organotin compounds such as di-n-alkyltin mercaptides, dibutyl tin dilaurate, and dibutyl tin maleate, epoxy resins, especially epoxidized oils such as epoxidized soybean oil and epichlorohydrin adducts of bisphenols such as bisphenol A, organic phosphites, such as triphenyl phosphite, diphenyl decyl phosphite, didecyl phenyl phosphite and tridecyl phosphite. Certain mixtures of metal salts or soaps are preferred, especially barium-cadmium soaps, barium-cadmium-zinc soaps, and barium-zinc soaps.

The amount of vinyl stabilizer is not critical to this invention, provided of course it is present in at least an amount sufficient to reduce attack on the pigment of the present invention. The actual amount will vary depending upon the particular stabilizer, metal and conditions of use of the product. In general, however, this protective amount is at least about one weight percent, based upon the weight of the metal, with increased protection being obtained with increasing amount. Ultimately an optimum value is reached, commonly below about 5 to about 10%, above which no concomitant increase in stability is observed. Use of amounts of stabilizer in excess of this value ordinarily is uneconomical and, in some instances, may adversely affect the coated flake product, as by reducing its free flowing character.

As a special case of the foregoing, it has been found particularly desirable to incorporate chelating agents into the flake product. A particularly useful chelating agent is benzotriazole, which, when present in amounts varying from about 1 to about 4 weight percent, based upon the metal, greatly improves the resistance of copper flakes to "greening" under severe conditions.

The stabilizer can be incorporated in the coated flake by any convenient technique, as by stirring a mixture of a solution of the stabilizer with the coated flake while evaporating off the solvent. Obviously, in such a process, the solvent must be less volatile than the stabilizer. In addition, it should wet the surface of the coated flake, and thus should be polar. Suitable solvents are hydrophilic, polar compositions, and include ketones such as acetone, methyl ethyl ketone and the like. Solvents need not be employed, however, where the stabilized flake is to be incorporated into a vehicle having a hydrophilic, polar compound as its solvent. The amount of solvent, when employed, is not critical, provided there is sufficient solvent to both dissolve the stabilizer, and wet the metal flakes.

Finally, when such stabilizers are employed, it has been found desirable to treat the stabilized flake with hydrophilic materials, such as alkylated benzene commonly employed as plasticizer, e.g. Escoflex 175 sold by East Coast Chemical Co. and Conoco H 300 sold by Continental Oil Co. These materials, when present in an amount of from about 1 to about 10 weight percent, preferably 2 to about 6 weight percent, based upon coated flake, inhibit the tendency of the stabilized flakes to agglomerate under conditions of high humidity.

The following example is illustrative of this aspect of the invention.

Example XXIV

To 100 parts of a dried, coated 90% copper, 10% zinc flake (3000–4000 cm.$^2$/gm. water coverage) produced in a manner similar to the process described in Example XXII, was added 2.75 parts of benzotriazole dissolved in 11.0 parts of 99% isopropanol and 75.0 parts heptane, in a Baker-Perkins type high-shear mixer. The mixture was stirred at 250° F. and 20 inches (gauge) vacuum until the solvent had evaporated off. Then 4.2 parts of alkylated benzene plasticizer in 76.5 parts octane was added and the octane was evaporated off while stirring.

To illustrate the superior stability of the resulting product, two samples of pigmented polyvinyl chloride were prepared, one containing the unmodified parent pigment and the other containing the benzotriazole-modified pigment of this example, employing the following formulation: 100 parts polyvinyl chloride (Geon 103EP), 40 parts butyl octyl phthalate plasticizer, 1.0 part epoxidized soybean oil (Paraplex G–61), 2.0 parts barium-cadmium-zinc liquid stabilizer (Clarechem CLB 101), 1.0 part barium-cadmium solid stabilizer (Clarechem CLB–900), and 4.9 parts pigment. Each blend was cast into films of 6-mil thickness and baked at 350° F. for three minutes. Each film was then exposed to a water drop until dry (several hours), sandwiched with a white plastic film produced from a similar formulation, except that it also contained 8 percent lauric acid, and exposed in an oven at 180° F. and 1½ p.s.i. compression until greening was noted. The sample containing the pigment having no benzotriazole evidenced moderate greening at 24 hours, whereas the sample containing the pigment of this example evidenced no greening at 24 hours and only slight to moderate greening at 72 hours when the test was terminated.

Example XXV

A dry blend of 100 parts of a dried, coated 90% copper, 10% zinc flake (3000 to 4000 cm.$^2$/gm. water coverage) produced in a manner similar to the process described in Example XXII and 3.1 parts of powdered benzotriazole was prepared, and then 25 parts of the mixture was added to 75 parts of a vehicle consisting of 7.5 parts SS nitrocellulose (30/35 cps.), 5.4 parts octyl butyl phthalate and 87.1 parts lacquer solvent. Similar pigmented nitrocellulose vehicles were prepared employing uncoated flakes and the coated flake without added benzotriazole. Gelation occurred in 1 day in the vehicle containing the uncoated flake, in 3 days for the coated flake, and in 2–3 weeks with the benzotriazole-treated material.

In a second test, 11.1 parts of the three different pigments were incorporated into 88.9 parts of a vinyl coating vehicle consisting of 11.9 parts of a mixture of polyvinyl chloride and polymethylmethacrylate, 1.0 part butyl octyl phthalate and 87.1% methyl ethyl ketone solvent. Each mixture was cast onto a 3.8-mil thick plasticized polyvinyl chloride film, using a blade of 1-mil clearance, to simulate a gravure printed ink layer. After drying for 1 hour, the samples were subjected to the water-drop test of Example XXIV. The samples containing uncoated flake exhibited slight to moderate greening in 8 hours at 160° F. and very severe greening in 24 hours at 160° F. The coated samples without benzotriazole evidenced slight to moderate greening in 24 hours at 160° F. and moderate to severe greening in 24 hours at 180° F. The benzotriazole samples evidenced no greening after 24 hours at 160° F., none to slight greening in 24 hours at 180° F., and slight to moderate greening in 48 hours at 180° F.

Having thus provided a written description of the present invention and provided specific examples thereof, it should be understood that no undue restrictions or limitations are to be imposed by reason thereof but that the present invention is defined by the appended claims.

What is claimed is:

1. A process for producing metal flakes having a glass-like coating comprising forming a mixture of metal flakes, water, and a sodium silicate solution having a sodium oxide to silica ratio of about 1:1 to about 1:3.75, heating said mixture to boiling with agitation, adding to said mixture while heating an emulsifier and a polar non-volatile water-immiscible organic carrier in amounts sufficient to form an emulsion of aqueous sodium silicate solution in said organic carrier, and continuing to heat said emulsion to gradually eliminate water therefrom and to form a paste comprising metal flakes coated with a hard glass-like coating of sodium silicate dispersed throughout said organic carrier.

2. A process according to claim 1 in which said mixture comprises about 80 to 200 parts by weight of water and about 16 to 60 parts by weight of sodium silicate solution, based on 100 parts by weight of metal flakes.

3. The process of claim 1 including the steps of adding an organic solvent as a diluent to said paste, thereby forming a suspension of the paste therein, adding a dilute aqueous alkaline solution to said suspension in an amount sufficient to cause precipitation of the coated flakes, removing the supernatant liquid, and drying the precipitated sodium silicate coated flakes.

4. The process of claim 3 in which said alkaline solution is a solution of sodium hydroxide, sodium carbonate, or sodium citrate.

5. A process for producing dry free flowing metal flakes having a glass-like coating comprising forming a mixture of metal flakes, water in an amount sufficient to keep the metal flakes moving freely past each other during subsequent processing, and a sodium silicate solution having a sodium oxide to silica ratio of about 1:1 to about 1:3.75, heating said mixture to boiling with agitation for about 2 to 30 minutes, adding to said mixture while heating an emulsifier and a polar non-volatile water immiscible organic carrier in amounts sufficient to form an emulsion of aqueous sodium silicate solution in said organic carrier, continuing heating said emulsion for about 1 to 5 hours to gradually eliminate water therefrom and to form a paste comprising metal flakes coated with a hard glass-like coating of sodium silicate dispersed throughout said organic carrier, adding to said paste an organic solvent as a diluent thereby forming a suspension of the paste therein, adding a dilute aqueous sodium hydroxide solution to said suspension in an amount sufficient to cause precipitation of the coated flakes, removing the supernatant liquid and drying the precipitated sodium silicate coated flakes.

6. The process of claim 1 including the steps of adding an organic solvent as a diluent to said paste, thereby forming a suspension of the paste therein, adding a dilute aqueous alkaline solution to said suspension in an amount sufficient to cause precipitating of the coated flakes removing the supernatant liquid, washing the flakes and adding a water solution of a polyvalent metal salt to said coated flakes.

7. The process of claim 6 in which said polyvalent metal salt is calcium acetate.

8. A process of producing a dry free flowing metal flake having a glass-like coating comprising forming a mixture of metal flakes, water, emulsifier, aqueous ammonia and a sodium silicate solution having a sodium oxide to silica ratio of about 1:1 to about 1:3.75, heating said mixture with agitation, cooling said mixture and then adding thereto an organic solvent and a non-ionic emulsifier thereby forming an organic flake containing phase and a water phase, removing the water phase, adding sodium silicate solution and an organic solvent in amounts sufficient to form an organic flake containing phase and a water phase, removing the water phase, adding sodium silicate solution and water to said organic phase, heating said mixture to form a hard glass-like silicate coating around said flake, forming a mixture of said silicate coated flakes, a surfactant and an aqueous solution of calcium chloride, heating said mixture and recovering from the mixture, metal flakes coated with a glass-like coating of calcium silicate.

9. A process of producing a dry free flowing metal flake having a glass-like coating comprising forming a mixture of metal flakes, water, emulsifier, aqueous ammonia and a sodium silicate solution having a sodium oxide to silica ratio of about 1:1 to about 1:3.75, heating said mixture with agitation, cooling said mixture and then adding thereto an organic solvent and a non-ionic emulsifier thereby forming an organic phase containing metal flakes coated with a thin layer of sodium silicate and a water phase containing undesirable contaminants, removing the water phase and washing the metal flakes, adding sufficient water and sodium silicate solution to said organic phase containing said metal flakes to form a slurry, heating said slurry so as to remove the organic solvent and to form a water dispersion of metal flakes coated with a hard glass-like silicate coating, adding a surfactant and a solution of calcium chloride to said water dispersion, heating said dispersion and recovering therefrom metal flakes coated with a hard glass-like coating of calcium silicate.

10. The process of claim 9 in which an alkylated glycine is added to said water dispersion of metal flakes.

11. A dry free flowing metal flake encased in a hard glass-like coating of at least one silicate selected from the group consisting of a sodium silicate and polyvalent metal silicates, said coating being directly bonded to the metal of said flake.

12. A metal flake according to claim 11 in which said polyvalent metal silicate is a Group II metal silicate.

13. A metal flake according to claim 11 in which said coating consists essentially of sodium silicate.

14. A metal flake according to claim 11 in which said coating consists essentially of sodium silicate and calcium silicate.

15. A metal flake according to claim 11 in which said coating consists essentially of calcium silicate.

16. A dry free flowing metal flake of copper or copper alloy encased in a hard glass-like coating of at least one silicate selected from the group consisting of sodium silicate and polyvalent metal silicates, said coating being directly bonded to the metal of said flake.

17. A method according to claim 3 including the step of mixing the thus-produced flakes with a vinyl stabilizer or a chelating agent.

18. A method according to claim 17 wherein said vinyl stabilizer is at least one of a cadmium, zinc or barium soap.

19. A method according to claim 17 wherein said chelating agent is benzotriazole.

20. A method according to claim 5 including the step of mixing the thus-produced flakes with a vinyl stabilizer or a chelating agent.

21. A method according to claim 20 wherein said vinyl stabilizer is at least one of a cadmium, zinc or barium soap.

22. A method according to claim 20 wherein said chelating agent is benzotriazole.

23. A metal flake according to claim 11 including in said coating a vinyl stabilizer or a chelating agent in an amount sufficient to stabilize said metal flake.

24. A metal flake according to claim 23 wherein said vinyl stabilizer is at least one of a cadmium, zinc or barium soap.

25. A metal flake according to claim 23 wherein said chelating agent is benzotriazole.

26. A metal flake according to claim 16 including in said coating a vinyl stabilizer or a chelating agent in an amount sufficient to stabilize said metal flake.

27. A metal flake according to claim 26 wherein said vinyl stabilizer is at least one of a cadmium, zinc or barium soap.

28. A metal flake according to claim 26 wherein said chelating agent is benzotriazole.

References Cited
UNITED STATES PATENTS

| | | | |
|---|---|---|---|
| 1,924,311 | 8/1933 | Frey | 106—308 |
| 1,940,707 | 12/1933 | Browne | 117—135.1 |
| 3,210,316 | 10/1965 | Merck et al. | 106—290 |

JAMES E. POER, Primary Examiner

U.S. Cl. X.R.

106—291, 292, 308, 309; 117—100